March 19, 1935. S. J. NORDSTROM 1,994,618
VALVE
Filed Sept. 23, 1929 2 Sheets-Sheet 1
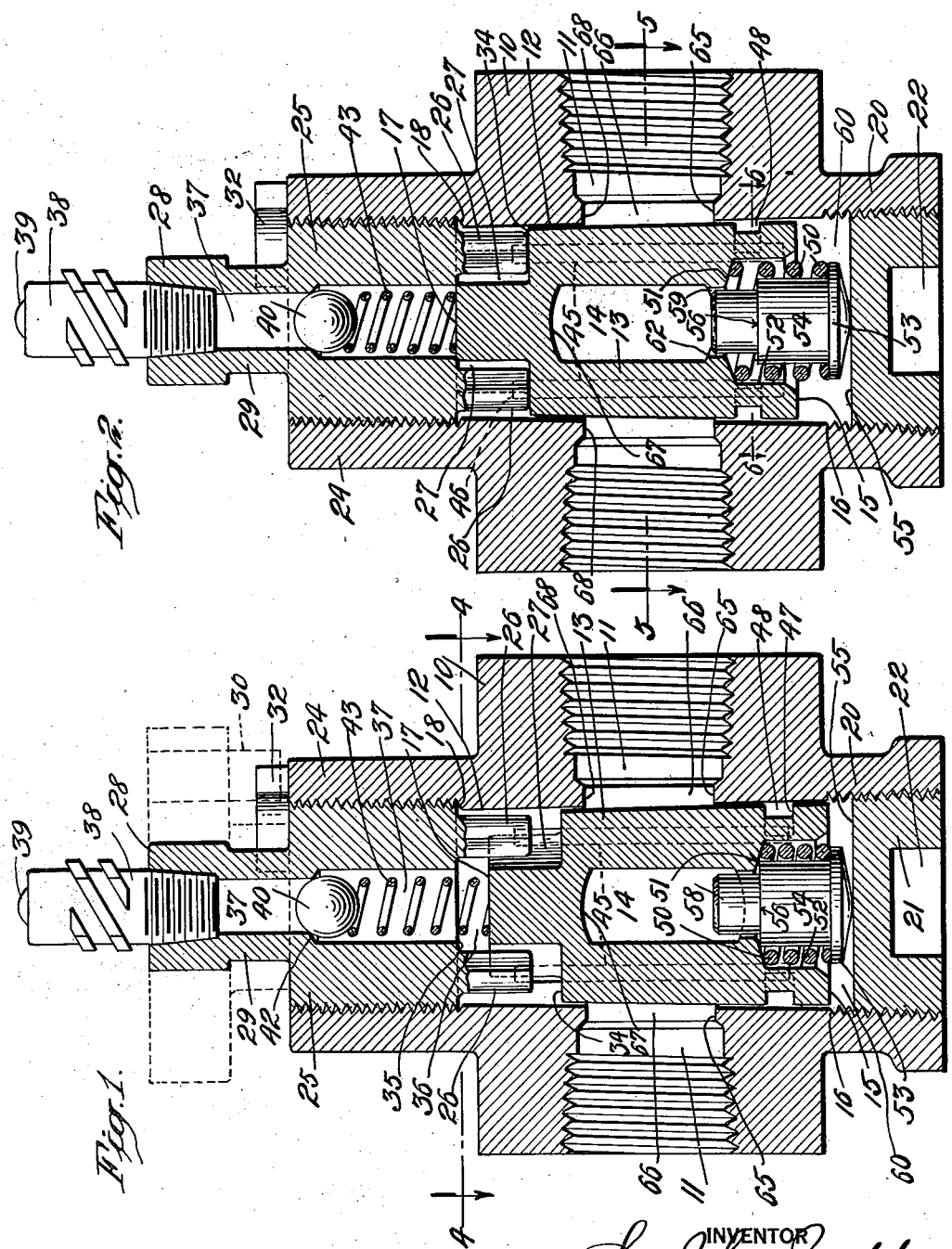

March 19, 1935. S. J. NORDSTROM 1,994,618

VALVE

Filed Sept. 23, 1929  2 Sheets-Sheet 2

INVENTOR
Sven Johan Nordstrom
BY Archibald Cox
ATTORNEY

Patented Mar. 19, 1935

1,994,618

UNITED STATES PATENT OFFICE 1,994,618

VALVE

Sven Johan Nordstrom, Oakland, Calif., assignor to Merco Nordstrom Valve Company, San Francisco, Calif., a corporation of Delaware Application September 28, 1929, Serial No. 395,805

12 Claims. (Cl. 251—93)

The invention relates to an improvement in valves and more particularly to an improvement in plug valves of the pressure lubricated type. The invention forming the subject-matter of the present application is shown and described in my copending application Serial No. 365,004, filed May 22, 1929, but not claimed therein.

The object of the present invention is to provide plug valves with novel features of construction to improve the operation of such valves whether they are of the cylindrical plug type or of the tapered plug type shown and described in my said application. To this end the invention consists in the improved plug valve hereinafter fully described and particularly pointed out in the appended claims. It will be understood that the specific form of valve herein shown and described is chosen simply for purposes of illustration, inasmuch as the features of the invention are equally applicable to cylindrical plug valves and tapered plug valves having the mode of operation herein indicated.

Figure 3:
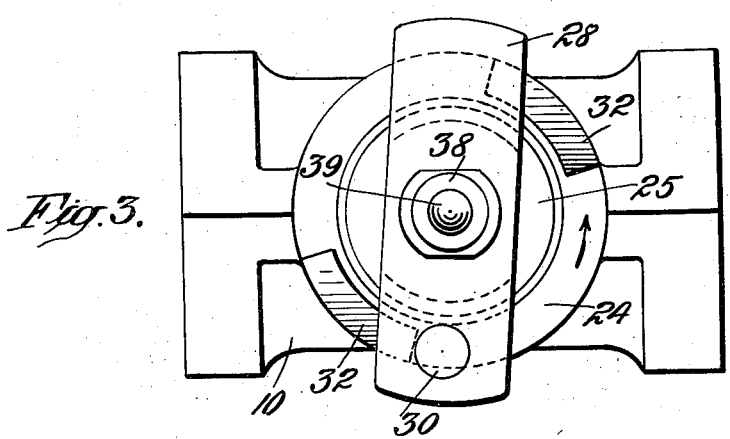
Figure 4:
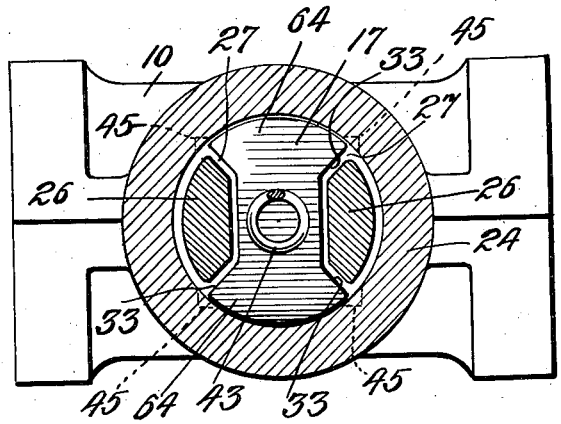
Figure 5:
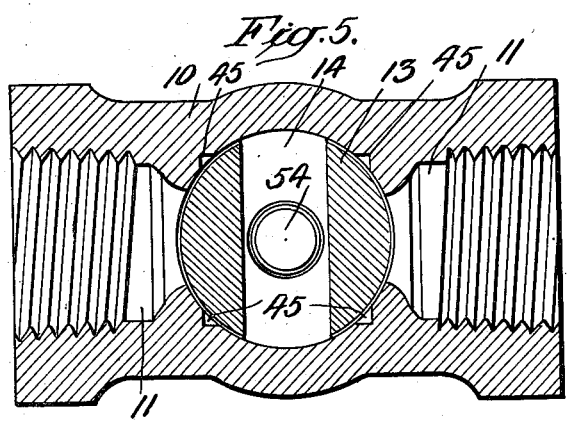
Figure 6:
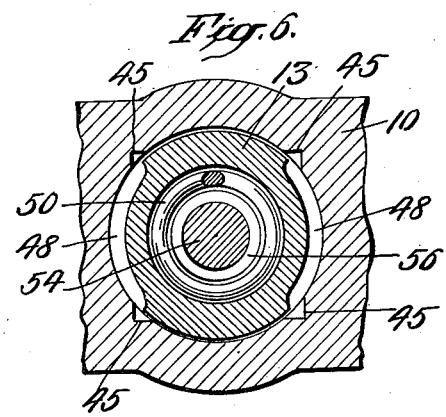

In the accompanying drawings illustrating the preferred form of the invention, Fig. 1 is a longitudinal section through the improved valve, with the plug shown at the limit of its axial movement in one direction in the bore in the casing; Fig. 2 is a view similar to Fig. 1, but with the plug shown at the limit of its axial travel in the opposite direction; Fig. 3 is a top plan of the valve parts shown in Fig. 1; Fig. 4 is a horizontal section taken along the line 4—4 of Fig. 1; Fig. 5 is a horizontal section taken along the line 5—5 of Fig. 2; and Fig. 6 is a detail transverse section through the plug and taken on the line 6—6 of Fig. 2.

The improved valve as illustrated in the drawings comprises a casing 10 having a fluid passageway 11 extending therethrough and a bore or valve seat 12 formed transversely of the passageway. The bore or valve seat 12 may be either cylindrical or tapered, and in the illustrated valve the bore 12 tapers slightly from its larger end 16 to its smaller end 18. Rotatably positioned in the bore 12 is a plug 13 having a hole 14 therein adapted to register with the passageway 11 when the plug is turned to open position. The plug is shown in the drawings in its closed position shutting off the passageway 11. The plug is tapered correspondingly to the bore 12 and is substantially shorter than the bore in order that it may be moved axially in both directions therein. In Fig. 1 the plug 13 is shown in the position of greatest separation from the bore and in this position the extremity 15 of the larger end of the plug lies in the plane passing through the point 16 at the larger end of the bore. In Fig. 2 the plug 13 is shown in the position in which its peripheral surfaces most nearly approach the coacting surfaces of the bore or valve seat 12, and in this position of the plug the extremity 17 of the smaller end thereof lies in a plane which is substantially coincident with the plane passing through the point 18 which may be regarded as the termination of the smaller end of the bore.

While the valve is in operation, that is to say, mounted in a pipe line to control the flow of fluid, the plug may occupy either the position shown in Fig. 1 or the position shown in Fig. 2, or it may occupy any intermediate position between these two extreme positions according to the conditions of operation as hereinafter set forth. Whatever the axial position of the plug 13 with respect to the bore 12, the coacting peripheral surfaces of the plug and the bore, which may be termed the coacting valve surfaces, effectively control the fluid flow through the passageway 11 because the space between these coacting surfaces is kept filled with lubricant under pressure in the manner presently to be described. The lubricant employed for this purpose may be any one of the usual lubricants sold on the market for use in pressure lubricated valves, having regard to the particular kind of service for which the valve is intended. Such lubricants are usually sold in stick or cartridge form and they differ somewhat in consistency or viscosity depending upon the service in which they are to be used. Any of these lubricants when forced between the coacting valve surfaces of the plug and the bore provide an effective fluid tight seal for the space or joint between them. It will be understood that if the plug is designed to have a substantial axial movement in the bore, the taper of the plug and the bore must be so adjusted that, whatever the axial position of the plug in the bore, the lubricant used will form an effective seal between the adjacent peripheral surfaces of the plug and the bore.

Since the improved valve in common with other plug valves of this type may be used in any position relatively to the mounting of the plug 13 in the casing 10, the valve has been shown in the position illustrated in Figs. 1 and 2 for convenience of description only. It will be understood, therefore, that terms of position and direction herein refer only to the position of the valve as shown in the drawings. In this position of the valve the bore 12 is vertically arranged and the passageway 11 is horizontally arranged. The bore 12 constitutes the middle section of a bore extending entirely through the casing transversely of the passageway 11. The lower end of this bore terminates in an internally threaded annular flange 20 extending downwardly from the lower side of the casing. A closure in the form of a pipe plug 21 screwed into the flange 20 is provided with a central recess 22 for the reception of the tool by which it is manipulated. The upper end of the transverse bore through the casing terminates in an elongated annular projection 24 extending upwardly from the top side of the casing. The projection 24 is provided with an internal right hand thread to receive a correspondingly threaded head 25 arranged to be rotated to turn the plug 13 to its closed and open positions. For this purpose the inner or lower end of the head 25 has a loose driving connection with the upper or smaller end of the plug comprising two lugs 26 extending downwardly from the lower end of the head. As seen in Fig. 4 the lugs 26 are truncated segments in cross-section and are loosely received in correspondingly shaped recesses 27 formed in the extremity of the upper end of the plug 13. The lugs 26 are substantially as long as the recesses 27 are deep. Between the ends 33 of the recesses 27 the material of the upper end of the plug 13 is left as two arcuate portions 64 each substantially 90° in length.

The outer or upper end of the head 25 is formed as a T-shaped member the cross-piece 28 of which is connected with the body portion or threaded part of the head by a contracted neck-like part 29. The cross-piece 28 is adapted to receive a wrench by which the head is rotated to turn the plug 13. In order to restrict the turning of the plug to an arc of substantially 90° only, the cross-piece 28 carries a downwardly projecting pin 30 which is adapted to travel between the adjacent ends of the two stops 32 extending upwardly from the upper end of the annular projection 24. To compensate for the back-lash between the lugs 26 and the adjacent cooperating edges 33 of the recesses 27, the stops 32 are spaced apart so that the cross-piece 28 will turn beyond its 90° position, as indicated in Fig. 3, thereby assuring that the plug 13 will make a full 90° turn in each direction. The axial position of the head 25 in the annular projection 24 is determined upon before the pin 30 is inserted into its hole in the cross-piece 28, since the pin 30 by cooperation with the stops 32 limits the head to a restricted travel in either direction which is slightly over 90°. The axial position of the head 25 in the annular projection 24 is determined by the amount of space to be left between the peripheral surfaces of the plug 13 and the coacting surfaces of the bore when the plug is at the limit of its upward travel—if the plug and the bore are tapered. If, however, the features of the present invention are applied to a cylindrical plug valve the axial position of the head 25 in the projection 24 will be determined simply by the amount of axial travel permitted to the plug in the direction toward the head 25. The inner or lower surface 35 of the head 25 acts as a stop against which the upper end 17 of the plug contacts, and since the lugs 26 are substantially as long as the recesses 27 are deep the bottom surfaces 34 of the recesses will contact with the inner or lower extremities of the lugs 26. This condition of the parts is indicated in Fig. 2.

The means for conducting a supply of lubricant into the space between the peripheral surfaces of the plug and the bore comprises a lubricant chamber 36 formed between the upper end 17 of the plug 13 and the inner or lower end 35 of the head 25. This chamber 36 is indicated in Fig. 1 and it will be understood that as the plug 13 travels axially in the bore 12 toward the head 25 the axial dimension of the chamber 36 decreases. The space or chamber 36 is in communication with the inner end of a bore 37 formed axially in the head 25 and adapted to receive lubricant introduced under pressure into the valve through a fitting 38 threaded into the outer end of the bore 37. The fitting 38 may be of well-known construction adapted for connection with a device known as a pressure grease or lubricant gun. The outer end of the fitting is closed by a ball check valve 39 to prevent back flow of lubricant. The bore 37 is also provided with a ball check valve 40 held against its seat 42 in the bore by means of a spring 43 the lower end of which bears against the middle point of the extremity 17 of the upper end of the plug 13. Instead of being attached to the cross-piece 28 of the head 25 the fitting 38 may be attached to the casing at any convenient point at which it is suitable to introduce lubricant under pressure into the valve. Where the valve is provided with a pressure gun fitting, the lubricant is introduced into the valve under pressure. It will be understood, of course, that a conventional pressure screw may be employed instead of the fitting 38, in which case the lubricant is introduced into the channel 37 in stick or cartridge form, after which the pressure screw is turned inwardly to compress the lubricant, to force it into the spaces of the valve adapted to contain the lubricant.

It has been found desirable in valves of this type to provide the lubricant passage 37 with a spring-pressed check valve such as the ball valve 40 in order to prevent loss of lubricant outwardly through the conventional check valve 39 provided with the fitting 38. The spring 43 has been found necessary because the leakage through the valve 39 is usually so slow that the lubricant under pressure in the lower end of the bore 37 will force lubricant past the ball 40 and into the upper end of the bore 37 and thence outwardly through the check valve 39 before seating the ball against the shoulder 42. Thus when a valve of this type is provided with a conventional fitting 38 purchasable in the open market it is necessary, in order to prevent leakage of lubricant outwardly through the head 25, to provide in the head a spring-pressed check valve.

In order to conduct the lubricant more readily to the coacting valve surfaces of the plug 13 and the bore 12 and fill the space between these surfaces, the bore is provided with four longitudinally arranged channels 45 spaced substantially 90° apart. The upper ends 46 of the channels extend upwardly beyond the bottom surfaces 34 of the recesses 27 in the upper end of the plug when the plug is at the limit of its upward travel, as indicated in Fig. 2, so that lubricant may pass freely from the lubricant containing spaces between the head 25 and the plug into the channels in this position of the plug. The lower ends of the channels 45 terminate at a point which is substantially coincident with the lower edges 47 of two oppositely disposed arcuate grooves 48 formed in the lower end of the plug, when the plug is at the limit of its downward movement, as shown in Fig. 1. The grooves 48 are each substantially 90° in length, as indicated in Fig. 6. When lubricant is introduced under pressure into the valve through the fitting 38 the lubricant filling the chamber 36 acts on the upper end of the plug and moves the plug axially downwardly to the position shown in Fig. 1.

The lubricating system of the valve is so arranged that lubricant under pressure is supplied to all the grooves 45 only when the plug is in substantially full open and closed positions. In any other position of the plug two of the grooves, those exposed to the line fluid pressure in the valve, are cut off from the supply of lubricant under pressure from the chamber 36 and its connected spaces. By spacing the longitudinal grooves in the bore 12 substantially 90° apart and by making the arcuate portions 64 of the upper end of the plug 90° in length, it will be understood (as seen in Fig. 4) that when the plug is in the position indicated—its closed position—or is turned through an angle of 90° to its open position, the edges 33 of the recesses 27 bounding or terminating the arcuate portions 64 lie opposite substantially the middle points of the grooves 45. Hence in these two positions of the plug lubricant is supplied to all grooves 45, but in any other position of the plug the arcuate portions 64 seal or cut off two diametrically disposed grooves 45, and the valve parts are so arranged that the grooves which are cut off from the source of lubricant under pressure are the grooves which are exposed to the line pressure. The arcuate grooves 48 being each substantially 90° in length are so positioned that they are supplied with lubricant under pressure when the plug is in its closed position, as indicated in Fig. 6. It should be observed with respect to the arcuate portions 64 of the upper end of the plug that they perform the double function of sealing the two grooves 45 exposed to the line pressure when the plug is in any position other than its substantially full open and closed positions and of cooperating with the lugs 26 to effect the turning of the plug. In other words, I have arranged a part of the plug turning means to perform the function of cutting off the supply of lubricant under pressure to the grooves 45 which are exposed to the line pressure when the plug 13 is in any position other than its substantially full open and closed positions.

When the spaces in the valve adapted to receive lubricant have been filled and the pressure gun removed from the fitting 38, a constant supply of lubricant is automatically conducted to the peripheral surfaces of the plug and the bore through the channels 45 by moving the plug axially against the lubricant in the chamber 36 by means of a spring 50 interposed between the inner end 51 of a bore 52 (formed axially in the lower end of the plug 13) and the upper surface of the laterally projecting edge of the head 53 of a pivot pin 54. The spring 50 is of greater tension than the spring 43 and consequently is able to move the plug 13 axially against the action of the spring 43. The filling of the chamber 36 by lubricant under pressure causes the plug 13 to act against and compress the spring 50 to the condition shown in Fig. 1. As the lubricant becomes dissipated during the operation of the valve the spring 50 expands and constantly urges the end 17 of the plug against the lubricant in the chamber 36, thereby forcing it into the channels 45 and thence into the space between the plug 13 and the bore 12, it being understood that inasmuch as the plug is rotatably positioned in the bore there exists between them a space sufficiently large to receive lubricant under pressure.

Since the spring 50 constantly urges the plug 13 axially toward the head 25 and consequently forces the pivot pin 54 in the opposite direction against the inner surface 55 of the closure 21, I reduce to a minimum the friction between the head 53 of the pin 54 and the surface 55 of the closure 21, when the plug is turned, by conically shaping the outer surface of the head 53 of the pin 54 to provide an anti-friction bearing for contact with the surface 55, as is clearly indicated in Figs. 1 and 2. The upper edge or shoulder 56 of the body portion of the pivot pin 54 serves as a stop to limit the downward axial movement of the plug 13 by engaging the bottom surface 51 of the bore 53 in the lower end of the plug. The reduced upper end 58 of the pin 54 centers the pin and projects into a hole 59 in the lower end of the plug 13. The clearance between the end 58 of the pin 54 and the sides of the hole 59 is small in order to prevent sediment or other foreign matter from passing into the space 60 between the lower end of the plug 13 and the upper surface 55 of the closure 21, but is large enough to permit lubricant which may have passed into the space 60 to escape into the hole 14 through the plug and thence into the line. This is a feature of importance since the plug 13 should be free to descend to the limit of its downward movement when lubricant is introduced into the chamber 36 to provide a sufficient supply of lubricant for constant and automatic feeding to the peripheral surfaces of the plug and its bore over long periods.

The upper or inner end 58 of the pivot pin 54 will be of such length that when the plug 13 has been moved to the limit of its upward movement, as shown in Fig. 2, the upper extremity of the end 58 of the pin should be substantially flush with the lower end 62 of the hole 14 through the plug. Consequently, as the plug is moved axially in the opposite direction when lubricant is introduced into the valve, the end 58 of the pin 54 will project upwardly beyond the bottom 62 of the hole 14. When the plug 13 is at the limit of its downward travel, the end 58 of the pivot pin will project into the hole 14, a distance equal to the axial travel of the plug 13, as is indicated in Fig. 1. In order that this projection of the end 58 of the pivot pin into the hole 14 may not restrict the flow of fluid through the valve the hole 14 has been correspondingly enlarged. The upper or inner end 58 of the pivot pin terminates in or near the plane which passes through the bottom 65 of the contracted part 66 of the passageway 11 through the casing, and when the plug is at the limit of its upward movement this plane is substantially coincident with the plane which passes through the bottom 62 of the hole 14. Thus when the plug is in this position there is a substantially flat surface extending from one contracted part 66 of the passageway 11 to the other, and consequently the fluid passing through the hole 14 will carry or wash away any sediment or foreign matter which may have deposited on the bottom 62 of the hole 14 and become lodged there while the plug 13 is in such position that the end 58 of the pivot pin projects upwardly beyond the bottom 62 of the hole 14. When the plug 13 is in this position the upper end 67 of the hole 14 extends upwardly into the casing beyond the plane passing through the upper points 68 of the contracted portions 66 of the passageway 11, and when the plug 13 is in the position shown in Fig. 1 the plane passing through the upper end 67 of the hole 14 is substantially coincident with the plane passing through the upper points 68 of the contracted portions 66 of the passageway 11. Since, however, the hole 14 is enlarged to compensate for the projection of the end 58 of the pivot pin into the hole 14 there is no restriction of the passageway 11 regardless of the vertical position of the hole 14.

The improved valve operates as follows: When the parts of the valve have been assembled and before any lubricant has been introduced into the valve, the spring 50 will force the plug 13 to the limit of its upward travel, as shown in Fig. 2. The pressure gun having been attached to the fitting 38 lubricant will be forced into the valve until the chamber 36, the grooves 45 and 48 and the space between the peripheral surfaces of the plug and its bore are completely filled with lubricant. As the lubricant enters the upper end of the axial bore 37 in the head 25 it unseats the ball valve 40 against the action of the spring 43 and passes downwardly into the lower end of the bore 37 and encounters the extremity 17 of the plug 13. As the operator continues to introduce lubricant into the bore 37, the plug 13 is moved axially downwardly against the action of the spring 50 until the bottom 51 of bore 52 in the lower end of the plug meets the shoulder 56 of the pivot pin 54. When all the spaces adapted to contain lubricant have been filled the pressure gun is removed from the fitting 38 and the valve is in condition for use. When the downward pressure exerted against the ball check valve 40 by lubricant entering the bore 37 ceases, the spring 43 urges the ball 40 upwardly and seats it against the shoulder 42. As the lubricant between the peripheral or coacting valve surfaces of the plug 13 and the bore 12 becomes dissipated during the operation of the valve a constant and automatic supply of lubricant is fed into this space to replace the dissipated lubricant by the pressure of the plug 13 against the lubricant in the chamber 36 under the action of the spring 50. It will be understood in this connection that inasmuch as the plug 13 is sealed from the atmosphere at both ends of the bore the plug is in a balanced condition with respect to the line pressure of the fluid passing through the valve. Consequently the amount of pressure exerted by the plug 13 against the lubricant in the chamber 36 is entirely proportionate to the tension of the spring 50. The plug 13 may at all times be readily turned to either open or closed position because of the fact that the conical head of the pivot pin 54 provides an anti-friction bearing against the surface 55 of the closure 21. On recharging the valve with lubricant under pressure the plug 13 may always be forced to the limit of its downward travel with the bottom 51 of the bore 52 in contact with the shoulder 56 of the pivot pin, because any lubricant which accumulates in the space 60 and in the bore 52 will be forced through the opening 59 into the hole 14. At the same time the restricted aperture between the end 58 of the pin and the sides of the opening 59 prevents sediment from working into the space 60. If very finely divided sediment should work into the bore 52 it will be caught by the lubricant in the bore and forced outwardly again into the hole 14 on the recharging of the valve with lubricant and the consequent downward movement of the plug 13 against the action of the spring 50. And in this connection it will be observed that the relative movement between the sides of the opening 59 and the inner end of the pin 54 due to the axial travel of the plug will prevent the sediment or other foreign material from packing into and clogging the restricted aperture between the sides of the opening 59 and the inner end of the pin 54.

Having thus described the invention, what I claim as new is:

1. In a valve comprising a casing having a passageway therethrough and a bore or seat formed transversely of the passageway, a plug rotatably positioned in the bore and having a hole adapted to register with the passageway, the bore being provided at each side of the passageway with longitudinal grooves, said grooves being spaced substantially 90° apart, one end of the plug being provided with two oppositely disposed recesses leaving on the end of the plug two arc-shaped oppositely disposed peripheral portions each substantially 90° in length, a head rotatably mounted in the casing, the inner end of the head having inwardly projecting lugs loosely received in the recesses in the end of the plug to form a driving connection with the plug, the spaces between the lugs and the sides of the recesses being adapted to contain lubricant communicating with all the grooves when the plug is in either its substantially full open or closed position, the peripheral arc-shaped portions of the end of the plug being adapted to shut off two oppositely disposed grooves from the lubricant-containing spaces when the plug is turned from either of said positions.

2. In a valve comprising a casing having a passageway therethrough and a bore or seat formed transversely of the passageway, a plug rotatably positioned in the bore and having a hole adapted to register with the passageway, said plug being arranged to move axially in both directions in the bore, the casing being closed at both ends of the bore, means whereby lubricant under pressure may act against one end of the plug to move it axially in one direction, the other end of the plug being provided with a bore having a restricted part communicating with the hole through the plug, a pin located in the bore in the plug and having a reduced inner end projecting into the restricted part of the bore, the outer end of the pin being formed as a head having a laterally extending flange, a spring interposed between the flange of the head and the bottom of the bore in the plug for moving the plug axially in the opposite direction, and the outer face of the head of the pin being formed as a bearing co-acting with the adjacent side of the casing.

3. In a valve comprising a casing having a passageway therethrough and a bore or seat formed transversely of the passageway, a plug rotatably positioned in the bore and having a hole adapted to register with the passageway, said plug being arranged to move axially in both directions in the bore, the casing being closed at both ends of the bore, means whereby lubricant under pressure may act on one end of the plug to move it axially in one direction, the other end of the plug being provided with a bore having at its inner end a restricted part, a pin located in the bore, the inner end of the pin being reduced to enter the restricted part of the bore and forming a shoulder with the rest of the pin, said shoulder being adapted to co-act with the bottom of the bore to form a stop limiting the axial movement of the plug under the action of the lubricant under pressure, a spring interposed between a part of the pin and the bottom of the bore in the plug to move the plug axially in the opposite direction, and the outer end of the pin being formed as a bearing co-acting with the adjacent side of the casing.

4. In a valve comprising a casing having a passageway therethrough and a bore or seat formed transversely of the passageway, a plug rotatably positioned in the bore and arranged to move axially in both directions therein, said plug having a hole therethrough adapted to register with the passageway, said hole being of larger cross-section than the passageway, means whereby the plug may be moved axially in both directions, one end of the plug being provided with a bore communicating with the hole through the plug, a pin located in the bore, the inner end of the pin projecting into the hole through the plug as the plug moves in the direction toward the pin, the hole through the plug being of larger cross-section than the passageway to compensate for the cross-sectional area of the hole occupied by the pin.

5. In a valve comprising a casing having a passageway therethrough and a bore or seat formed transversely of the passageway, a plug rotatably positioned in the bore and arranged to move axially in both directions therein, the plug having an elongated hole therethrough adapted to register with the passageway, one end of the hole through the plug being adapted to aline with one side of the passageway when the plug is at the limit of its movement in one direction and the other end of the hole through the plug being adapted to aline with the opposite side of the passageway when the plug is at the limit of its movement in the opposite direction, means whereby the plug may be moved axially in both directions, one end of the plug being provided with a bore communicating with the hole through the plug, and a pin located in the bore in the plug, the inner end of the pin being substantially flush with the adjacent end of the hole through the plug when the plug is at the limit of its movement in one direction and the end of the pin projecting into the hole through the plug a distance equal to the axial travel of the plug when the plug is at the limit of its movement in the opposite direction.

6. In a valve comprising a casing having a passageway therethrough and a bore or seat formed transversely of the passageway, a plug rotatably positioned in the bore and arranged to move axially in both directions therein, said plug having an elongated hole therethrough, one end of said hole being in substantial alinement with one side of the passageway when the plug is at the limit of its movement in one direction, the other end of said hole being in substantial alinement with the opposite side of the passageway when the plug is at the limit of its movement in the opposite direction, means whereby lubricant under pressure may act against one end of the plug to move it axially in one direction, the other end of the plug being provided with a bore having a restricted part communicating with the hole through the plug, a pin located in the bore in the plug and having a reduced inner end substantially filling the restricted part of the bore, and a spring interposed between the bottom of the bore in the plug and a part of the pin for moving the plug axially in the opposite direction, the inner end of the pin being substantially flush with the adjacent end of the hole through the plug when the spring has moved the plug axially to the limit of its movement in one direction, and said inner end of the pin projecting into the hole through the plug a distance equal to the axial travel of the plug when the lubricant under pressure has moved the plug to the limit of its movement in the opposite direction.

7. In a valve, a casing having a passageway therethrough and a bore or seat formed transversely of the passageway, a plug rotatably positioned in the bore and having a hole adapted to register with the passageway, said plug being longitudinally movable in the bore, a chamber formed in the casing at one end of the plug, the end of the plug adjacent to the chamber having an aperture affording communication between the chamber and the hole through the plug, and a member abutting the base of said bore and projecting into and substantially restricting said aperture, the plug and the member having sufficient clearance therebetween to prevent clogging of the aperture by foreign material from the fluid passing through the valve and permit passage of lubricant from the chamber to the hole.

8. In a valve, a casing having a passageway therethrough and a bore or seat formed transversely of the passageway, a plug rotatably positioned in the bore and having a hole adapted to register with the passageway, said plug being arranged to move axially in the bore, a chamber formed at one end of the plug, the plug having an aperture affording communication between the chamber and the hole through the plug, a member abutting the base of said bore and disposed within and substantially restricting said aperture, and means for moving the plug axially relatively to the member, said plug and member having sufficient clearance therebetween to prevent clogging of the aperture by foreign material and permit passage of lubricant from the chamber to the hole.

9. In a valve, a casing having a passageway therethrough and a bore formed transversely of the passageway, a plug rotatably positioned in the bore and having a hole adapted to register with the passageway, a chamber adapted to receive lubricant under pressure and formed within the casing at one end of the plug, a recess interrupting a peripheral portion of the plug and exposed to said chamber, means including a portion projecting into said recess for turning the plug member, and lubricant grooves extending along the sealing surface between the periphery of the plug and the bore, one groove being exposed when the plug is turned from closed position, both of said grooves having communication with said recess at spaced points when the plug is in closed position, one of said grooves being cut off from communication with said recess by the uninterrupted portion of the plug in said chamber when exposed by turning the plug.

10. In a valve, a casing having a passageway therethrough and a bore or seat formed transversely of the passageway, a plug rotatably positioned in the bore and having a hole adapted to register with the passageway, one end of the plug terminating within the casing and having a recess therein interrupting the peripheral surface of the plug, a head rotatably mounted in the side of the casing adjacent to said end of the plug and having its inner end projecting into the recess to form a driving connection therewith for turning the plug, a chamber adapted to receive lubricant under pressure formed between the recessed end of the plug and the adjacent side of the casing and with which the recess communicates, there being a longitudinal groove in the bore on each side of one end of the passageway, said recess communicating with the grooves when the plug is in closed position, one of said grooves being exposed when the plug is turned from closed position, the peripheral part of the plug cutting off the exposed groove from communication with the recess when the plug is turned from closed position.

11. In a valve, a casing having a passageway therethrough and a bore or seat formed transversely of the passageway, a plug rotatably positioned in the bore and having a hole adapted to register with the passageway, said plug being movable axially, a chamber formed in the casing at one end of the plug, the end of the plug adjacent the chamber having an aperture affording communication between the chamber and the hole through the plug, and a member projecting into and substantially restricting said aperture to prevent clogging of the aperture, said member having a shoulder engaging said plug to limit axial movement of the plug.

12. In a valve comprising a casing having a passageway therethrough and a bore or seat formed transversely of the passageway, a plug rotatably positioned in the bore and having a hole adapted to register with the passageway, the bore being provided at each side of the passageway with longitudinal grooves spaced substantially ninety degrees apart, one end of said plug being provided with two oppositely disposed recesses leaving on the end of the plug two oppositely disposed peripheral portions each substantially ninety degrees in length, a rotatable operating head threadedly engaging the casing and having projecting lugs loosely received in said recesses, and means for introducing lubricant under pressure into said recesses, said oppositely disposed peripheral portions cutting off diametrically opposite longitudinal grooves in certain positions of the plug.

SVEN JOHAN NORDSTROM.